US011981122B2

(12) United States Patent
Yamaguchi

(10) Patent No.: US 11,981,122 B2
(45) Date of Patent: May 14, 2024

(54) INK-JET RECORDING APPARATUS

(71) Applicant: KYOCERA Document Solutions Inc., Osaka (JP)

(72) Inventor: Kiyotaka Yamaguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 132 days.

(21) Appl. No.: 17/890,457

(22) Filed: Aug. 18, 2022

(65) Prior Publication Data

US 2023/0056035 A1 Feb. 23, 2023

(30) Foreign Application Priority Data

Aug. 23, 2021 (JP) ................................ 2021-135540

(51) Int. Cl.

*B41J 11/00* (2006.01)
*B41J 2/165* (2006.01)
*B41J 11/42* (2006.01)

(52) U.S. Cl.

CPC .......... *B41J 11/005* (2013.01); *B41J 11/0055* (2013.01); *B41J 2/1652* (2013.01); *B41J 11/0085* (2013.01); *B41J 11/009* (2013.01); *B41J 11/42* (2013.01); *B41J 2203/011* (2020.08)

(58) Field of Classification Search

CPC .... B41J 11/005; B41J 11/0055; B41J 2/1652; B41J 11/0085; B41J 11/009; B41J 11/42; B41J 2203/011

See application file for complete search history.

(56) References Cited

U.S. PATENT DOCUMENTS 10,926,557 B2 * 2/2021 McLaughlin ........ B41J 2/16526
11,390,084 B2 * 7/2022 Hotani ................. B41J 2/16523
2012/0001976 A1 1/2012 Katoh et al. .................... 347/16

FOREIGN PATENT DOCUMENTS

JP 2012-011724 A 1/2012

* cited by examiner

*Primary Examiner* — Geoffrey S Mruk
(74) *Attorney, Agent, or Firm* — Stein IP, LLC

(57) ABSTRACT

An ink-jet recording apparatus includes a recording head, an irregularity detecting unit, a recording medium conveyance unit, and a control unit. The irregularity detecting unit detects an irregularity with the recording medium conveyed toward the recording head. The recording medium conveyance unit has a recording medium diversion unit into which the recording medium with which an irregularity has been detected by the irregularity detecting unit is conveyed. The control unit can perform flushing operation and, when the irregularity detecting unit detects an irregularity with the recording medium, the control unit cancels the flushing operation set immediately before the recording medium with which the irregularity has been detected and conveys, by controlling the recording medium conveyance unit, the recording medium to the recording medium diversion unit.

5 Claims, 4 Drawing Sheets

INK-JET RECORDING APPARATUS

INCORPORATION BY REFERENCE

This application is based on and claims the benefit of priority from Japanese Patent Application No. 2021-135540 filed on Aug. 23, 2021, the contents of which are hereby incorporated by reference.

BACKGROUND

The present disclosure relates to ink-jet recording apparatuses.

On an ink-jet recording apparatus, flushing (dummy ejection) is performed in which ink is ejected from nozzles regularly to reduce or prevent clogging of the nozzles resulting from ink drying. In flushing, for example, ink is ejected so as to form lines extending in the sheet width direction, which is orthogonal to the sheet conveyance direction, during a non-image-recording period in which no ink is ejected onto a recording medium such as a sheet of paper.

SUMMARY

According to one aspect of the present disclosure, an ink-jet recording apparatus includes a recording head, an irregularity detecting unit, a recording medium conveyance unit, and a control unit. The recording head ejects ink onto a recording medium to record an image. The irregularity detecting unit detects an irregularity with the recording medium conveyed toward the recording head. The recording medium conveyance unit has a recording medium diversion unit that is disposed between the recording head and the irregularity detecting unit and into which the recording medium with which an irregularity has been detected by the irregularity detecting unit is conveyed. The recording medium conveyance unit is disposed opposite, so as to face, the recording head to convey the recording medium. The control unit controls the operation of the recording head and the recording medium conveyance unit. The control unit can perform flushing operation to eject ink from the recording head during a non-image-recording period in which the ink is not ejected onto the recording medium. When the irregularity detecting unit detects an irregularity with the recording medium, the control unit cancels the flushing operation set immediately before the recording medium with which the irregularity has been detected, and conveys, by controlling the recording medium conveyance unit, the recording medium to the recording medium diversion unit.

DETAILED DESCRIPTION

An embodiment of the present disclosure will be described below with reference to the accompanying drawings. The scope of the present disclosure is not limited to what is disclosed herein.

Figure 1:
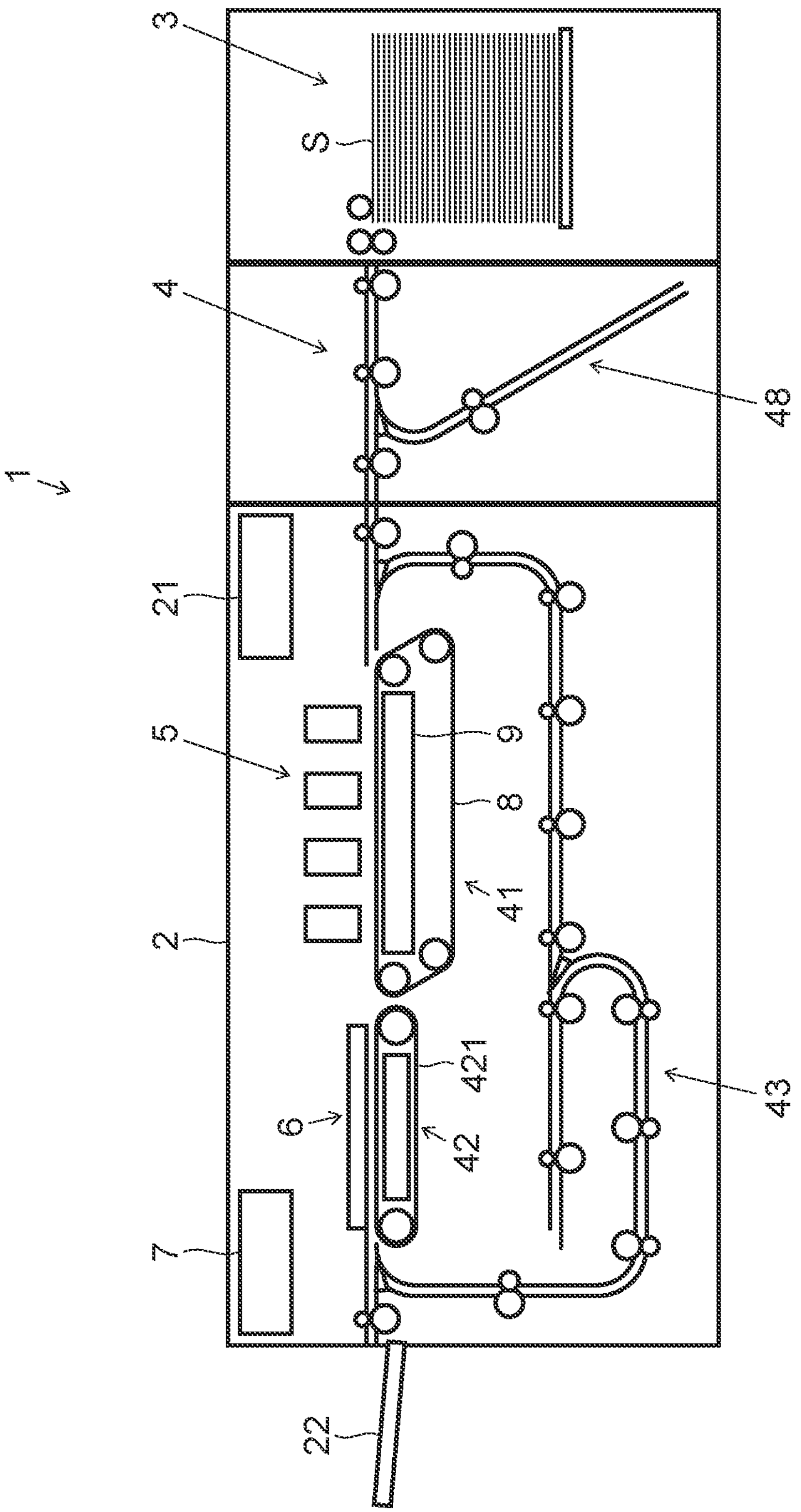
FIG. 1 is a schematic sectional front view of an ink-jet recording apparatus according to one embodiment of the present disclosure.
Figure 2:
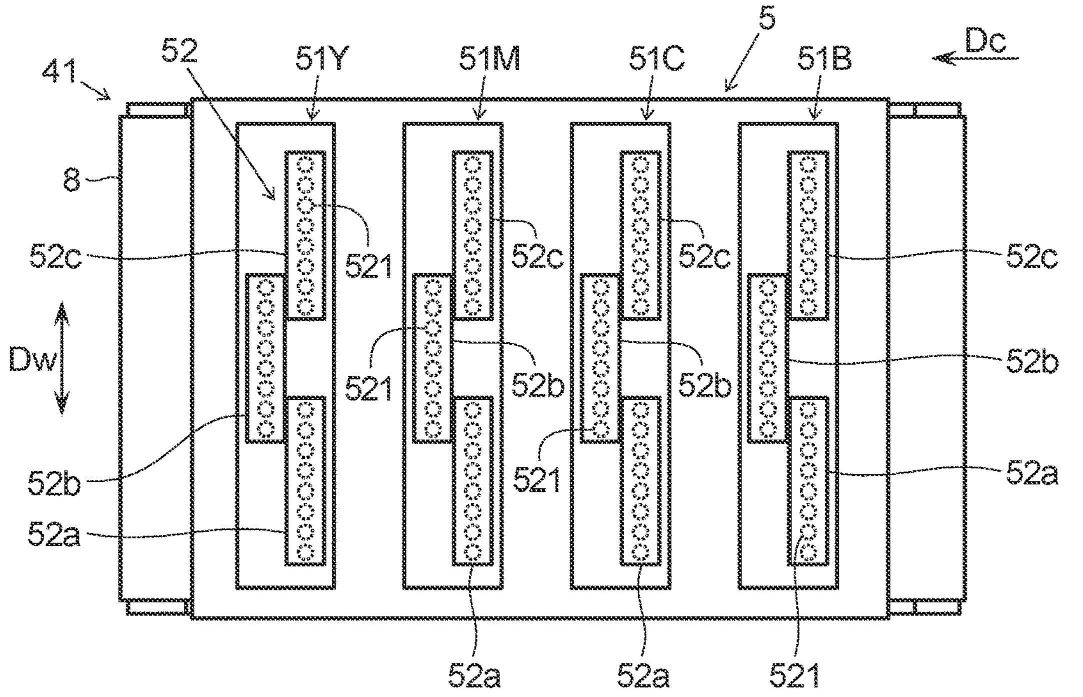
FIG. 2 is a top view around a recording unit in the ink-jet recording apparatus in FIG. 1.
Figure 3:
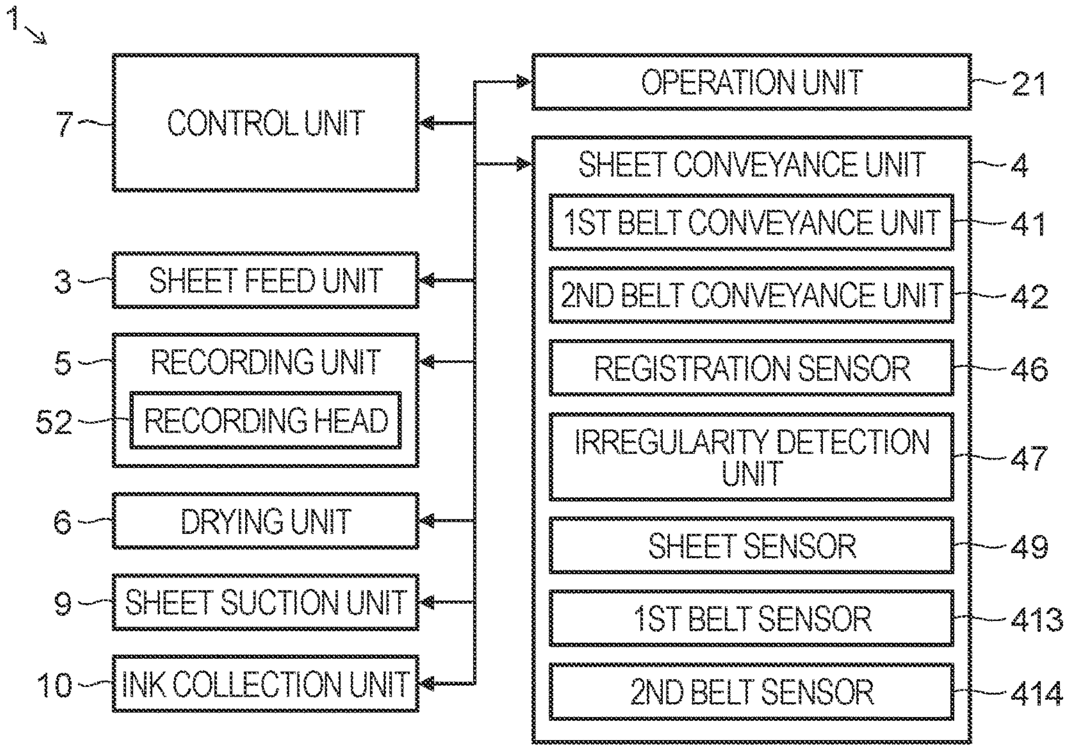
FIG. 3 is a schematic block diagram of the ink-jet recording apparatus 1 in FIG. 1.

FIG. 1 is a schematic sectional front view of an ink-jet recording apparatus 1 according to an embodiment. FIG. 2 is a top view around a recording unit 5 in the ink-jet recording apparatus 1 in FIG. 1. FIG. 3 is a schematic block diagram of the ink-jet recording apparatus 1 in FIG. 1. The ink-jet recording apparatus 1 is, for example, a printer of an ink-jet printing type. As shown in FIGS. 1, 2, and 3, the ink-jet recording apparatus 1 includes an apparatus body 2, a sheet feed unit 3, a sheet conveyance unit 4, a recording unit 5, a drying unit 6, and a control unit 7.

The apparatus body 2 includes an operation unit (input unit) 21. For example, the operation unit 21 is disposed in an upper part of the front face of the apparatus body 2, and accepts, from a user, entry of settings for recording conditions as to the type of sheets (recording medium) to be used in recording, whether to enlarge or reduce, whether to perform duplex recording, and the like as well as entry of operation instructions and the like. Settings for different types of sheets include different sizes, thicknesses, materials (paper, OHP film), and the like. Entry of image data, recording conditions, operation instructions, and the like may be received from an external computer across a communication unit (not illustrated) provided in the apparatus body 2 and connected to a communication network or the like.

The sheet feed unit 3 stores a plurality of sheets (recording medium) S and, during recording, feeds out the sheets S one by one separately. The sheet conveyance unit 4 conveys a sheet S fed out from the sheet feed unit 3 to the recording unit 5 and then to the drying unit 6, and also discharges the sheet S having undergone recording and drying to a sheet discharge unit 22. In duplex recording, the sheet conveyance unit 4 directs a sheet S having undergone recording and drying on the first side to a reversal conveyance unit 43, and conveys the sheet S, after switching its conveyance direction and reversing it top side down, once again to the recording unit 5 and then to the drying unit 6.

The sheet conveyance unit 4 includes a first belt conveyance unit 41 and a second belt conveyance unit 42. The first and second belt conveyance units 41 and 42 convey a sheet S in a state held by suction on the outer sides of the top parts (the obverse surfaces) of a first and a second conveyance belt 8 and 421 respectively. The first belt conveyance unit 41 is disposed under the recording unit 5 to convey the sheet S. The second belt conveyance unit 42 is located downstream of the first belt conveyance unit 41 in the sheet conveyance direction, and is disposed in the drying unit 6 to convey the sheet S.

The recording unit 5 is disposed opposite the sheet S conveyed in a state held by suction on the top surface of the first conveyance belt 8, over the first conveyance belt 8 at a predetermined distance from it. As shown in FIG. 2, the recording unit 5 holds head units 51B, 51C, 51M, and 51Y corresponding to four colors of black, cyan, magenta, and yellow respectively. The head units 51B, 51C, 51M, and 51Y are disposed adjacent to each other along the sheet conveyance direction Dc, parallel to the sheet width direction Dw, which is orthogonal to the sheet conveyance direction Dc. The four head units 51B, 51C, 51M, and 51Y share a common basic structure, and accordingly in the following description the suffixes "B". "C", "M", and "Y" distinguishing the colors will be omitted unless distinction is necessary.

The head units 51 for different colors each include recording heads 52 of an ink-jet type. In the head unit 51 for each color, a plurality of recording heads 52 (e.g., three (52*a*, 52*b*, 52*c*)) are disposed in a staggered array along the sheet width direction Dw.

Each recording head 52 has a plurality of ink ejection nozzles 521 in a bottom part of it. The plurality of ink ejection nozzles 521 are disposed adjacent to each other along the sheet width direction Dw so as to be able to eject ink over the entire recording area on the sheet S. That is, each recording head 52 has a plurality of ink ejection nozzles 521 for ejecting ink onto the sheet S. The recording unit 5 ejects ink from the recording heads 52 in the head units 51B, 51C, 51M, and 51Y sequentially onto the sheet S conveyed on the first conveyance belt 8, and thereby records a full-color or monochrome image on the sheet S.

The drying unit 6 is disposed downstream of the recording unit 5 in the sheet conveyance direction, and includes the second belt conveyance unit 42. While the sheet S having an ink image recorded on it in the recording unit 5 is being conveyed in a state held by suction on the second conveyance belt 421 in the drying unit 6, the ink is dried.

The control unit 7 includes a CPU, a storage unit, and other electronic circuits and components (of which none is illustrated). Based on control programs and data stored in the storage unit, the CPU controls the operation of different blocks provided in the ink-jet recording apparatus 1 to perform processes related to the functions of the ink-jet recording apparatus 1. The sheet feed unit 3, the sheet conveyance unit 4, the recording unit 5, and the drying unit 6 individually receive instructions from the control unit 7, and cooperate to perform recording on the sheet S. The storage unit is composed of, for example, a combination of a non-volatile storage device, such as a program ROM (read-only memory) and a data ROM, and a volatile storage device, such as RAM (random-access memory).

The control unit 7 can perform flushing (dummy ejection) operation in which it makes the recording heads 52 eject ink with timing different from the timing with which ink is ejected onto the sheet S (during an image-recording period), that is, during a non-image-forming period in which no ink is ejected onto a sheet S. This helps reduce and prevent clogging of the ink ejection nozzles 521 resulting from ink drying.

Figure 4:
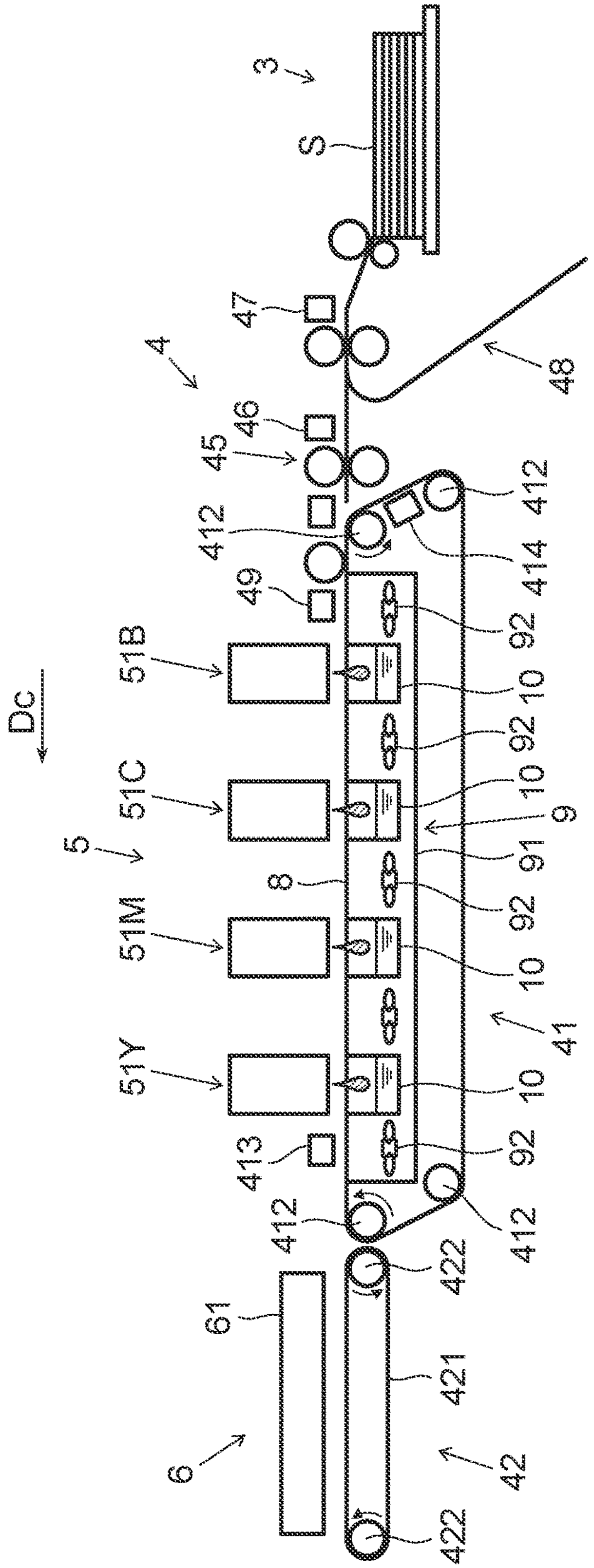
FIG. 4 is an illustrative diagram schematically showing a construction along a sheet conveyance passage from a sheet feed unit to a second belt conveyance unit in FIG. 1.

FIG. 4 is an illustrative diagram schematically showing the construction along the sheet conveyance passage from the sheet feed unit 3 to the second belt conveyance unit 42 in FIG. 1. For convenience' sake, ink ejected from the recording heads 52 are depicted (with water droplet-like symbols) under the recording head 52; the ink actually ejected is in droplets far smaller than those depicted (with water droplet-like symbols) in FIG. 4.

As shown FIG. 4, the sheet conveyance unit 4 includes a pair of registration rollers 45, a registration sensor 46, an irregularity detection unit 47, a sheet diversion unit (recording medium diversion unit) 48, and a sheet sensor 49.

The pair of registration rollers 45 is disposed downstream of the sheet feed unit 3 in the sheet conveyance direction Dc. Closely downstream of the pair of registration rollers 45 in the sheet conveyance direction Dc, the recording unit 5 and the first belt conveyance unit 41 are disposed. The sheet S fed out from the sheet feed unit 3 passes through the sheet conveyance unit 4 to reach the pair of registration rollers 45. Using the pair of registration rollers 45, the control unit 7 corrects a skew in the sheet S, and feeds forth the sheet S toward the first belt conveyance unit 41 with timing coordinated with ink ejection in the recording unit 5.

The registration sensor 46 is disposed closely upstream of the pair of registration rollers 45 in the sheet conveyance direction Dc. The registration sensor 46 detects the sheet S fed out from the sheet feed unit 3 reaching the pair of registration rollers 45. Based on a signal received from the registration sensor 46 indicating detection of the sheet S, the control unit 7 controls the rotation of the pair of registration rollers 45.

The irregularity detection unit 47 is disposed upstream of the registration sensor 46 in the sheet conveyance direction Dc. The irregularity detection unit 47 includes a sensor that detects an irregularity with the sheet S fed from the sheet feed unit 3 to the first belt conveyance unit 41. That is, the irregularity detection unit 47 detects an irregularity with the sheet S conveyed toward the recording heads 52. Irregularities with the sheet S will be described in detail later.

The sheet diversion unit 48 is disposed downstream of the irregularity detection unit 47 in the sheet conveyance direction Dc, upstream of the registration sensor 46 in the sheet conveyance direction Dc. That is, the sheet diversion unit 48 is disposed between the recording heads 52 and the irregularity detection unit 47. More specifically, an inlet through which the sheet diversion unit 48 receives the sheet S is disposed between the irregularity detection unit 47 and the recording heads 52 in the sheet conveyance passage leading from the irregularity detection unit 47 to the recording head 52. Specifically, the sheet diversion unit 48 branches off the sheet conveyance passage as the main passage extending from the sheet feed unit 3 to the first belt conveyance unit 41, and extends, for example, downward.

Based on a signal received from the irregularity detection unit 47 indicating detection of the sheet S, the control unit 7 conveys a sheet S with which an irregularity is detected to the sheet diversion unit 48. That is, to the sheet diversion unit 48 is conveyed a sheet S with which an irregularity is detected by the irregularity detection unit 47. In the sheet diversion unit 48, sheets S with which irregularities have been detected are stored.

The sheet sensor 49 is disposed downstream of the pair of registration rollers 45 in the sheet conveyance direction Dc, upstream of the recording unit 5 in the sheet conveyance direction Dc, above the first belt conveyance unit 41. The sheet sensor 49 is a sensor that detects the position, in the conveyance direction, of the sheet S conveyed by the first belt conveyance unit 41. Based on a signal received from the sheet sensor 49 indicating detection of the sheet S, the control unit 7 controls ink ejection from the ink ejection nozzles 521 onto the sheet S that has reached the positions opposite the recording heads 52 for different colors respectively.

The first belt conveyance unit 41 is disposed under the recording unit 5, opposite the recording unit 5 so as to face it. The first belt conveyance unit 41 holds the sheet S by suction on its top surface, and conveys the sheet S along the sheet conveyance direction Dc. The first belt conveyance unit 41 includes a first conveyance belt 8, rollers 412, a first belt sensor 413, and a second belt sensor 414.

The first conveyance belt 8 is an endless belt, and is stretched around four rollers 412 disposed inside. The rollers 412 are disposed inside the first conveyance belt 8, and are supported so as to be rotatable about rotation axes extending along the sheet width direction Dw (see FIG. 2). Of the four rollers, one is a driving roller, by which the first conveyance belt 8 is rotated so that its top part moves in the sheet conveyance direction Dc. The first conveyance belt 8 has a plurality of holes 81 and a plurality of openings 82 (opening groups 83), all penetrating the first conveyance belt 8 from top to bottom (see FIG. 5). The first conveyance belt 8 conveys the sheet S to a position opposite the bottom faces of the recording heads 52.

The first belt sensor 413 is disposed downstream of the recording unit 5 in the sheet conveyance direction Dc, above the first belt conveyance unit 41. The second belt sensor 414 is disposed inside the first conveyance belt 8, upstream, in the rotation direction of the first conveyance belt 8, of the roller 412 adjacent to the upstream end of the top part of the first conveyance belt 8 in the sheet conveyance direction Dc. The first and second belt sensors 413 and 414 detect the position of an opening group 83 (see FIG. 6), which is a set of a plurality of the openings 82 provided in the first conveyance belt 8. The first belt sensor 413 has a function equivalent to that of the sheet sensor 49.

The second belt conveyance unit 42 is disposed in the drying unit 6. The second belt conveyance unit 42 holds the sheet S by suction on its top surface, and conveys the sheet S along the sheet conveyance direction Dc. The second belt conveyance unit 42 includes a second conveyance belt 421 and rollers 422.

The second conveyance belt 421 is an endless belt, and is stretched around two rollers 422 disposed inside. The rollers 422 are disposed inside the second conveyance belt 421, and are supported so as to be rotatable about rotation axes extending along the sheet width direction Dw (see FIG. 2). Of the two rollers 422, one is a driving roller, by which the second conveyance belt 421 is rotated so that its top part moves in the sheet conveyance direction Dc.

The drying unit 6 includes a dryer 61. A sheet S having an image recorded on it by the recording unit 5 is, while it is being conveyed on the second belt conveyance unit 42 in the drying unit 6, dried by the dryer 61. The sheet S dried by the dryer 61 is conveyed downstream in the sheet conveyance direction Dc.

As shown in FIG. 4, the ink-jet recording apparatus 1 further includes a sheet suction unit 9 and ink collection units 10.

The sheet suction unit 9 is disposed in an upper part inside the first conveyance belt 8, opposite the surface (the inner side of the top part, the reverse surface) of the first conveyance belt 8 opposite from its sheet conveyance surface (the outer side of the top part, the obverse surface). The sheet suction unit 9 includes a sheet suction housing 91 and suction fans 92.

The sheet suction housing 91 has, inside it, a suction space surrounded by side walls from four sides. In regions upstream and downstream, in the sheet conveyance direction Dc, of each region where the first conveyance belt 8 faces a recording head 52, i.e., in regions where the first conveyance belt 8 does not face any recording head 52, the suction space faces the surface (the inner side of the top part, the reverse surface) of the first conveyance belt 8 opposite from its sheet conveyance surface (the outer side of the top part, the obverse surface). The suction space thus faces the surface of the first conveyance belt 8 opposite from its sheet conveyance surface mainly in five regions spread from below upstream, in the sheet conveyance direction Dc, of the recording head 52B for black to below downstream, in the sheet conveyance direction Dc, of the recording head 52Y for yellow.

The sheet suction housing 91 has a plurality of suction holes (not illustrated) disposed in its top face facing the first conveyance belt 8, over the suction space. The plurality of suction holes penetrate the sheet suction housing 91 in the top-bottom direction.

Figure 5:
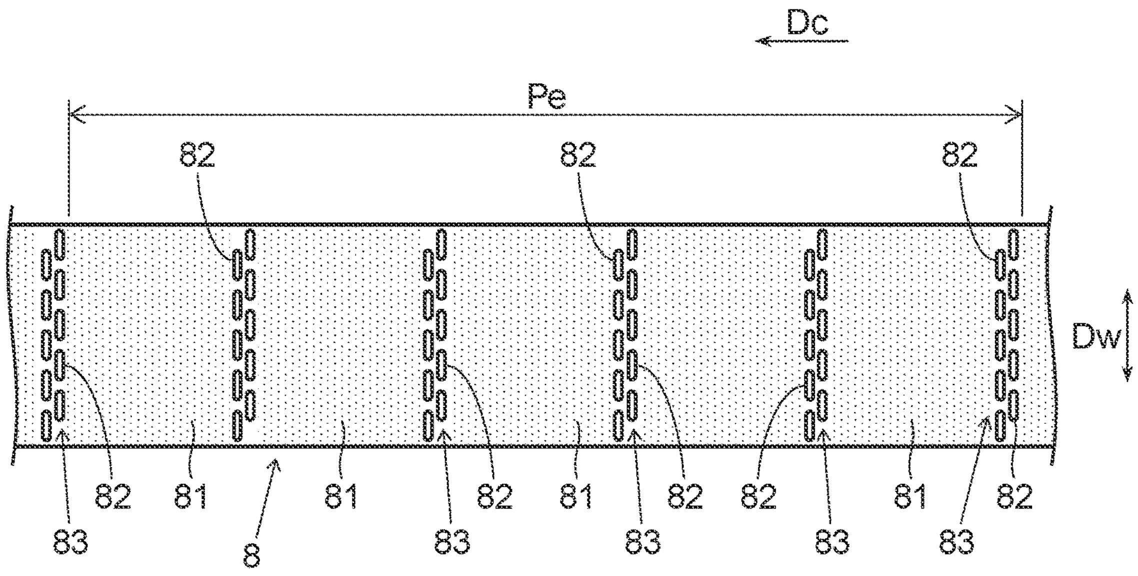
FIG. 5 is a plan view of a first conveyance belt in a first belt conveyance unit in FIG. 4.

The suction fans 92 are disposed inside the sheet suction housing 91, under the suction space. As shown in FIG. 5, the first conveyance belt 8 has a plurality of holes 81 and a plurality of openings 82. FIG. 5 is a plan view of the first conveyance belt 8 in the first belt conveyance unit 41 in FIG. 4.

The holes 81*s* and the openings 82 penetrate the first conveyance belt 8 from top to bottom. As the suction fans 92 are driven, the sheet suction unit 9 sucks air through the suction holes in the sheet suction housing 91 and the holes 81 and the openings 82 in the first conveyance belt 8, and thereby holds by suction a sheet S on the sheet conveyance surface (the outer side of the top part, the obverse surface) of the first conveyance belt 8.

The plurality of holes 81 and the plurality of openings 82 permit air to be sucked through them by the sheet suction unit 9, and thereby permit a sheet S to be sucked onto the outer side of the top part (the obverse surface) of the first conveyance belt 8 serving as the sheet conveyance surface. The opening area of the openings 82 is larger than the opening area of the holes 81. Through the openings 82 pass the ink ejected from the recording heads 52 during flushing. A plurality of (e.g., ten) the openings 82 constitute an opening group 83.

As shown in FIG. 5, the first conveyance belt 8 has a plurality of opening groups 83 every one period Pe in the sheet conveyance direction Dc, and has, for example, five of them in the embodiment. The opening groups 83 are disposed, for example, at equal intervals over one period Pe of the first conveyance belt 8 in the sheet conveyance direction Dc. During flushing, the ink ejected from all the ink ejection nozzles 521 in the recording heads 52 passes one of the openings 82 in the opening groups 83. The holes 81 are disposed between mutually adjacent opening groups 83 in the sheet conveyance direction Dc. No holes 81 are disposed in the regions where the opening groups 83 are disposed.

The ink collection units 10 are disposed under the recording heads 52, opposite them across the first conveyance belt 8. Each ink collection unit 10 is adjacent to, both upstream and downstream of it, the suction space in the sheet suction housing 91. The ink collection units 10 collects the ink that has passed through the openings 82 in the first conveyance belt 8 during flushing.

The ink-jet recording apparatus 1 further includes, though not illustrated, a liquid suction unit. The liquid suction unit is disposed under the ink collection units 10, and is connected to the ink collection units 10. The liquid suction unit sucks and discharges the liquid such as ink stored in the ink collection units 10.

In the ink-jet recording apparatus 1 according to the embodiment, when the irregularity detection unit 47 detects an irregularity with a sheet S, the control unit 7 cancels the flushing operation set immediately before the sheet S with which the irregularity has been detected, and makes the sheet conveyance unit 4 convey the sheet S to the sheet diversion unit 48.

Figure 6:
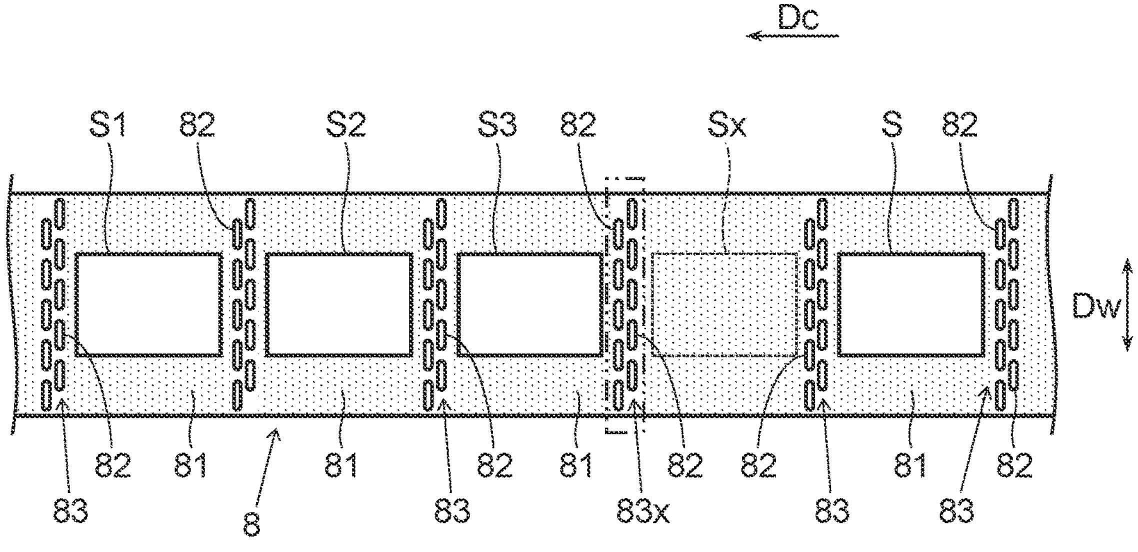
FIG. 6 is a plan view showing an example of arrangement of sheets on the first conveyance belt in FIG. 5.

FIG. 6 is a plan view showing an example of arrangement of sheets S on the first conveyance belt 8 in FIG. 5. For example, as with the first, second, and third sheets S1, S2, and S3 from upstream in the sheet conveyance direction Dc on the first conveyance belt 8 in FIG. 6, so long as no irregularity is detected with a sheet S by the irregularity detection unit 47, the control unit 7 performs flushing operation set for the opening group 83 immediately before each sheet S with predetermined timing and performs image recording on the sheet S.

By contrast, as with a sheet Sx (broken line) supposed to be the fourth from upstream in the sheet conveyance direction Dc on the first conveyance belt 8 in FIG. 6, if an irregularity is detected with a sheet Sx by the irregularity detection unit 47, the control unit 7 cancels the conveyance of the sheet Sx with which the irregularity has been detected onto the first conveyance belt 8, and cancels the flushing operation set for the opening group 83*x* immediately before the sheet Sx with which the irregularity has been detected. The control unit 7 then makes the sheet conveyance unit 4 convey the sheet Sx with which the irregularity has been detected to the sheet diversion unit 48 (see FIG. 4).

With the configuration described above, if an irregularity occurs with a sheet Sx and the sheet Sx is not conveyed to the position where the recording heads 52 performs recording on it, the flushing operation set for the opening group 83*x* immediately before the sheet Sx with which the irregularity has been detected is canceled. It is thus possible to reduce wasted ink during flushing.

Irregularities with a sheet S that cause the flushing operation immediately before the sheet S to be cancelled include, for example, the following.

For example, the irregularity detection unit 47 detects a multiple-feeding irregularity in which a plurality of sheets S are conveyed in a state overlapping each other. If the irregularity detection unit 47 detects multiple feeding with a plurality of sheets S fed in a state overlapping each other, the control unit 7 conveys the plurality of sheets S to the sheet diversion unit 48. With this configuration, if multiple feeding of sheets S occurs and no sheet S is conveyed to the position where the recording heads 52 perform recording, the flushing operation set immediately before the sheets S with which the irregularity has been detected is canceled. It is thus possible to reduce wasted ink during flushing.

For another example, the irregularity detection unit 47 detects, with respect to a sheet S fed out from the sheet feed unit 3, an irregularity in its conveyance position in the sheet width direction Dw and in its inclination relative to the sheet conveyance direction Dc. If the irregularity detection unit 47 detects an irregularity in the conveyance position or inclination of the sheet S, the control unit 7 conveys a plurality of sheets S to the sheet diversion unit 48.

With this configuration, if an irregularity occurs in the conveyance position or inclination of a sheet S and no sheet S is conveyed to the position where the recording head 52 performs recording, the flushing operation set immediately before the sheet S with which the irregularity has been detected is canceled. It is thus possible to reduce wasted ink during flushing.

For another example, the irregularity detection unit 47 detects, with respect to a sheet S fed out from the sheet feed unit 3, an irregularity of the sheet S having a hole such as a punch hole formed in it. If the irregularity detection unit 47 detects an irregularity of the sheet S having a hole formed in it, the control unit 7 conveys a plurality of sheets S to the sheet diversion unit 48.

With this configuration, if a sheet S has a hole in it and no sheet S is conveyed to the position where the recording head 52 performs recording, the flushing operation set immediately before the sheet S with which the irregularity has been detected is canceled. It is thus possible to reduce wasted ink during flushing.

For another example, the irregularity detection unit 47 detects, with respect to a sheet S fed out from the sheet feed unit 3, an irregularity of it being of a type different from the type of sheet S previously entered via the operation unit 21. Here, settings for different types of sheets include different sizes, thicknesses, materials (paper, OHP film), and the like. If the irregularity detection unit 47 detects a sheet S of a type different from the type of sheet S previously entered via the operation unit 21, the control unit 7 conveys a plurality of sheets S to the sheet diversion unit 48.

With this configuration, if a sheet S is of a type different from the type of sheet S entered via the operation unit 21 and no sheet S is conveyed to the position where the recording head 52 performs recording, the flushing operation set immediately before the sheet S with which the irregularity has been detected is canceled. It is thus possible to reduce wasted ink during flushing.

Instead, if the irregularity detection unit 47 detects a sheet S of a type different from the type of sheet S previously entered via the operation unit 21, how flushing operation is performed may be changed. For example, for those types of sheets, such as coated paper, that can maintain image quality with no flushing performed, even if the irregularity detection unit 47 detects a sheet S of a different type, this sheet S is conveyed to under the recording heads 52 and, while the flushing operation immediately before the sheet S is canceled, image recording on the sheet S is performed.

It should be understood that the embodiments of the present disclosure described above are not meant to limit the scope of the present disclosure, which thus can be implemented with any modifications made without departure from the spirit of the present disclosure.

What is claimed is:

1. An ink-jet recording apparatus comprising:

a recording head that ejects ink onto a recording medium to record an image;

an irregularity detecting unit that detects an irregularity with the recording medium conveyed toward the recording head;

a recording medium conveyance unit having a recording medium diversion unit that is disposed between the recording head and the irregularity detecting unit and into which the recording medium with which an irregularity has been detected by the irregularity detecting unit is conveyed, the recording medium conveyance unit being disposed opposite, so as to face, the recording head to convey the recording medium; and a control unit that controls operation of the recording head and the recording medium conveyance unit, wherein the control unit is configured to perform flushing operation to eject ink from the recording head during a non-image-recording period in which the ink is not ejected onto the recording medium and, when the irregularity detecting unit detects an irregularity with the recording medium, the control unit cancels the flushing operation set immediately before the recording medium with which the irregularity has been detected and conveys, by controlling the recording medium conveyance unit, the recording medium to the recording medium diversion unit.

2. The ink-jet recording apparatus according to claim 1, wherein when the irregularity detecting unit detects multiple feeding in which a plurality of sheets of the recording medium are conveyed in a state overlapping each other, the control unit conveys the plurality of sheets of the recording medium to the recording medium diversion unit.

3. The ink-jet recording apparatus according to claim 1, wherein when the irregularity detecting unit detects an irregularity in a conveyance position or inclination of the recording medium, the control unit conveys a plurality of sheets of the recording medium to the recording medium diversion unit.

4. The ink-jet recording apparatus according to claim 1, wherein when the irregularity detecting unit detects the recording medium having a hole formed therein, the control unit conveys a plurality of sheets of the recording medium to the recording medium diversion unit.

5. The ink-jet recording apparatus according to claim 1, further comprising an input unit that accepts input of a type of the recording medium, wherein when the irregularity detecting unit detects the recording medium of a type different from the type input via the input unit, the control unit conveys a plurality of sheets of the recording medium to the recording medium diversion unit.

* * * * *